Dec. 22, 1942. A. ZEUCH 2,306,030
GAS PRODUCER
Filed Feb. 20, 1939
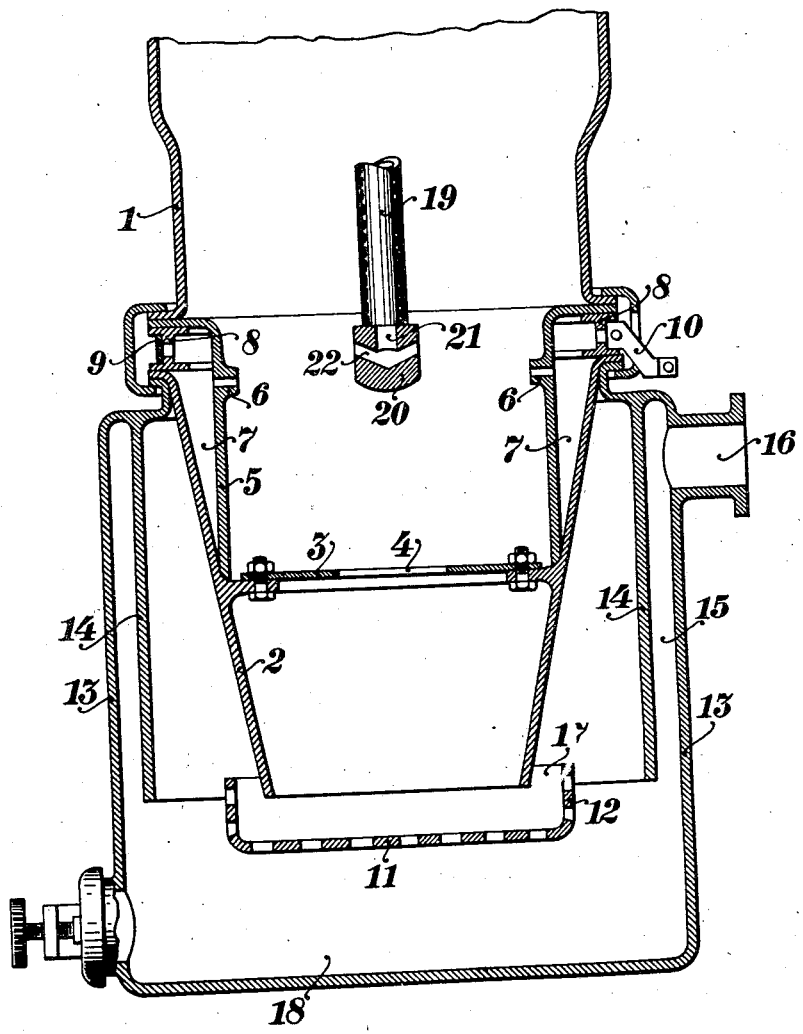
Inventor.
Alfred Zeuch
Atty.

Patented Dec. 22, 1942

2,306,030

UNITED STATES PATENT OFFICE 2,306,030

GAS PRODUCER

Alfred Zeuch, Wiener Neustadt, near Vienna, Germany; vested in the Alien Property Custodian Application February 20, 1939, Serial No. 257,479
In Austria February 21, 1938

4 Claims. (Cl. 48—76)

This invention relates to improvements in gas producers or generators of the type employing a downward draught for burning solid fuel such as wood, peat, lignite or the like.

Known generators of this type are constructed with a combustion chamber in the form of a downwardly directed cone. These generators have the disadvantage that the fuel which fills the combustion chamber becomes red hot in a zone situated in the constricted area and extending to the walls of the combustion chamber. This causes excessive expansion of the walls of the combustion chamber which gives rise to changes in shape and the formation of cracks and injuries to the welded joints necessitating the renewal of the combustion chamber.

This construction also has a further disadvantage of the distillation of tar. The gases which are formed pass downwardly along the walls of the combustion chamber whereby the proportion of tar is not altered in the reduction zone but settles out from the distilled gas.

The object of the invention is to remove the disadvantages of known generators by providing no direct connection between the wall of the combustion chamber and the red heat zone of the fuel and therefore keeping it at a comparatively low temperature so that alterations in shape and crack formations are avoided and the separation of tar from the distilled gas is checked by forcing the gas through the red hot layers of fuel in such a way that they do not come in contact with the walls of the combustion chamber so that the tar content is continuously changed into gas.

This object is obtained according to the invention by forming the combustion chamber with cylindrical walls and by dividing the same into two chambers preferably by a plate with a central opening which is arranged below the air intake, the upper chamber being the zone of gasification and the lower chamber forming the zone of reduction and through this construction all the gases are directed out of the fuel layers, which lie close to the wall of the combustion chamber, towards the centre of the chamber into the red heat zone. By this arrangement the red hot fuel layers of the gasification and reduction zones are isolated from the combustion chamber walls by nonglowing fuel layers which surround the same and the gases are prevented from passing along the walls of the combustion chamber.

A further advantage of the arrangement according to the invention is that the wall of the combustion chamber is constructed as a double wall with an annular air supply chamber. The inner wall forming the wall of the combustion chamber is cooled by the air supply thereby preventing overheating those parts of the combustion chamber walls which lie at the same height as the red hot zone. On the inner wall of this annular chamber which incloses the casing of the gas generator pipes may be arranged through which the air is uniformly directed out of the chamber on to the fuel.

A partition may be provided in the upper enlarged part of the chamber provided with adjustable air openings in order to regulate by hand or automatically the even distribution of the air.

With known generators the experiment has been made of moving the reduction zone also into the annular chamber which incloses the lower end of the combustion chamber (which in this case is filled with coke) by removing the air inlet to a position as low as possible. Apart from the combustion chamber becoming very much heated especially the lower part, by this construction it also causes excessive heating of the outer casing of the gas generator and an undesirable escape of heat outwards.

This is avoided according to the invention in that the area of the grate, which is arranged below the lower end of the combustion chamber, is larger than the cross section of the end of the combustion chamber so that the gases escaping from the latter will spread over a larger area, and can flow outside not only in a perpendicular direction but also laterally. It is not necessary to remove one part of the reduction zone into the annular chamber which encloses the bottom part of the combustion chamber as through the enlargement of the grate area a sufficient quantity of coke is provided below the lower end of the combustion chamber.

That part of the combustion chamber which is situated below the built-in structure having an ample length and the grate area being of adequate size a continuous reduction of the gases takes place inside the combustion chamber and directly below the same whereby the annular chamber which surrounds the end of the combustion chamber may be kept free and the casing will remain cool.

The accompanying drawing shows an elevation and section of a gas generator in accordance with the invention.

The lower part 2 of inverted conical shape is connected to the cylindrical upper part 1 of the combustion chamber. The part 2 is provided with a removable plate 3 provided with a perforation 4 in the centre.

The removable plate 3 is arranged about an equal distance from the lower end of the combustion chamber and the air intake so that two chambers of substantially the same size are formed in which the gasification zone is provided above the plate 3 and the zone for reduction below the plate 3. Above the plate 3 a cylindrical part 5 is provided which forms the inner wall of the combustion chamber up to the red heat zone and which carries the inwardly directed pipes 6. The upper end of the cylindrical part 5 connects with the upper part of the combustion chamber 1 whereby a space 7 is formed, between the parts 2 and 5 of the combustion chamber casing which widens towards the top and supports a partition 8 in the enlarged part provided with a ring 9 rotatable by a handle to regulate the air supply thereto.

The reduced lower part terminates above the grate 11, the area of which is substantially larger than the cross section of the lower end of the combustion chamber.

As shown in the drawing the grate 11 is formed around the periphery with a cylindrical flange 12 provided with perforations and projects slightly above the lower end of the combustion chamber. Between the outer casing 13 of the gas generator and the lower part of the combustion chamber 2 a cylindrical wall 14 is arranged to form an annular chamber 15 lying outside the wall through which the gases pass from the grate 11 to the gas outlet 16.

The wall 14 terminates at the lower end of the combustion chamber leaving an aperture 17 sufficiently large to allow coke and ashes to enter the chamber 18 below the grate 11.

When the gas generator is heavily loaded the gas produced will pass more through the centre part of the grate 11. The smaller the quantity of gas which is drawn off the more gas which passes out of the lower end of the combustion chamber will spread downwards and with a very small output it will pass laterally through the upright flanges 12 of the grate 11.

Instead of supplying air through the pipes 6 or simultaneously therewith air may be introduced through a pipe leading into the combustion chamber from above, as shown in the drawing an air inlet pipe 19 with a nozzle 20 is provided centrally of the combustion chamber 1. The nozzle 20 is provided with a central aperture 21 from which parts 22 radiate upwards at for example an angle of 45°. If air is introduced through the aperture 21 into a heated fuel charged generator the air will travel through the fuel in curved paths varying with the quantity which passes per time unit from the passage 22, i. e., in accordance with the velocity of the air.

Therefore at any time in accordance with the output a smaller or larger quantity of fuel may be made red hot and used for generating gas. The quantity of gas which is produced by the generator is therefore dependent on the quantity of air introduced or better the quantity of gas which is withdrawn at one time.

I claim:

1. A downdraft gas generator comprising a vertical fuel carrying combustion shaft, an upper straight-walled gasification chamber and a lower walled reduction chamber in said shaft, said straight walls meeting and joining the walls of the lower reduction chamber, air inlets in the upper end of said gasification chamber, a removable partition between said two chambers, a central passage in said removable parttiion, a residue chamber underneath said reduction chamber and discharge means for the produced gases connected to said residue chamber.

2. A downdraft gas generator comprising a fuel carrying vertical combustion shaft, an upper cylindrical straight-walled gasification chamber and a slightly tapered lower reduction chamber, a removable partition located substantially midway between the air entering zone and the lower end of said reduction chamber, a central passage in said removable partition, a residue chamber underneath said reduction chamber and discharge means for the produced gases connected to said residue chamber.

3. A downdraft gas generator comprising a fuel carrying vertical combustion shaft, an upper straight-walled gasification chamber and a slightly tapered lower reduction chamber, air inlets at the circumference of the upper end of said gasification chamber and in the center section thereof, a removable parttiion between said two chambers, a central passage in said removable partition, a residue chamber underneath said reduction chamber and discharge means for the produced gases connected to said residue chamber.

4. A downdraft gas generator comprising a fuel carrying vertical combustion shaft, an upper straight-walled gasification chamber and a slightly tapered lower reduction chamber, air inlets in the upper end of said gasification chamber, a removable partition between said two chambers, a central passage in said removable partition, a residue chamber underneath said reduction chamber, a cup-shaped grate in said residue chamber the end of said reduction chamber extending into said grate and the cross-sectional area of said grate being larger than the cross sectional area of the end of the reduction chamber, perforations in the bottom and in the side sections of said cup-shaped grate and discharge means for the produced gases connected to said residue chamber.

ALFRED ZEUCH.